United States Patent
Voit et al.

(10) Patent No.: US 8,077,732 B2
(45) Date of Patent: Dec. 13, 2011

(54) TECHNIQUES FOR INSERTING INTERNET PROTOCOL SERVICES IN A BROADBAND ACCESS NETWORK

(75) Inventors: Eric Voit, Bethesda, MD (US); Frank Brockners, Cologne (DE); Huw Jones, Oxfordshire (GB); Wojciech Dec, Amsterdam (NL)

(73) Assignee: Cisco Technology, Inc., San Jose, CA (US)

( * ) Notice: Subject to any disclaimer, the term of this patent is extended or adjusted under 35 U.S.C. 154(b) by 691 days.

(21) Appl. No.: 11/273,066

(22) Filed: Nov. 14, 2005

(65) Prior Publication Data

US 2007/0110048 A1 May 17, 2007

(51) Int. Cl.
*H04L 12/28* (2006.01)
*H04L 12/56* (2006.01)
(52) U.S. Cl. .................. 370/401; 370/352; 370/409
(58) Field of Classification Search .......... 370/352, 370/401, 389, 409
See application file for complete search history.

(56) References Cited

U.S. PATENT DOCUMENTS

| | | | |
|---|---|---|---|
| 6,424,657 B1 | 7/2002 | Voit et al. | |
| 6,512,762 B1 | 1/2003 | Renucci et al. | |
| 6,704,301 B2 | 3/2004 | Chari et al. | |
| 6,778,525 B1 | 8/2004 | Baum et al. | |
| 6,798,751 B1 | 9/2004 | Voit et al. | |
| 6,904,054 B1 | 6/2005 | Baum et al. | |
| 7,382,778 B2 | 6/2008 | Chari et al. | |
| 7,506,065 B2 | 3/2009 | LaVigne et al. | |
| 7,839,855 B2 | 11/2010 | Voit et al. | |
| 2001/0019557 A1 | 9/2001 | Hrastar et al. | |
| 2002/0044567 A1 | 4/2002 | Voit et al. | |
| 2002/0085552 A1 | 7/2002 | Tandon | |
| 2002/0186698 A1 | 12/2002 | Ceniza | |
| 2004/0264443 A1* | 12/2004 | Beck et al. | 370/352 |
| 2005/0152370 A1* | 7/2005 | Meehan et al. | 370/393 |
| 2005/0286503 A1* | 12/2005 | Oda et al. | 370/355 |
| 2006/0028983 A1 | 2/2006 | Wright | |
| 2006/0045075 A1* | 3/2006 | Jiang et al. | 370/352 |

(Continued)

FOREIGN PATENT DOCUMENTS

CN 101310486 11/2008

(Continued)

OTHER PUBLICATIONS

Lemon et al., "RFC 3442, The Classless Static Route Option for Dynamic Host Configuration Protocol (DHCP) version 4," Dec. 2002, The Internet Society.*

(Continued)

*Primary Examiner* — Jae Y Lee
(74) *Attorney, Agent, or Firm* — Patent Capital Group

(57) ABSTRACT

Techniques for inserting a network service in an Ethernet access network operated by an access service provider include sending routing data to customer premises equipment. The access network is between a physical layer link with customer premises equipment and a remote packet switched network. The routing data indicates a logical network address for an access gateway for access to the remote packet switched network, and a logical network address for an ancillary gateway for an ancillary service different from access to the remote packet-switched network. A data packet is received from customer premises equipment and it is determined whether a layer 2 destination address indicates the ancillary gateway. If so the data packet is directed to the ancillary gateway instead of the access gateway. Thus, the ancillary service is provided topologically closer to the customer premises equipment.

17 Claims, 6 Drawing Sheets

U.S. PATENT DOCUMENTS

| | | | |
|---|---|---|---|
| 2006/0045085 A1* | 3/2006 | He | 370/390 |
| 2006/0198302 A1* | 9/2006 | Sofman et al. | 370/229 |
| 2007/0110048 A1* | 5/2007 | Voit et al. | 370/389 |
| 2007/0274321 A1* | 11/2007 | Jonsson et al. | 370/395.53 |
| 2009/0129386 A1* | 5/2009 | Rune | 370/392 |

FOREIGN PATENT DOCUMENTS

| | | |
|---|---|---|
| EP | 1949621 | 7/2008 |
| WO | WO 2007/059406 A3 | 5/2007 |

OTHER PUBLICATIONS

International Preliminary Report on Patentability (1 page) and Written Opinion of the International Searching Authority (7 pages) for International Application No. PCT/US06/60720 mailed Oct. 26, 2007.

Notification of Transmittal of the International Search Report and the Written Opinion of the International Searching Authority, or the Declaration (1 page) and International Search Report (2 pages) for International Application No. PCT/US06/60720 mailed Oct. 26, 2007.

State Intellectual Property Office of the People's Republic of China, Application No 200680042373.9, Date of Issue Oct. 27, 2010, The First Office Action, 20 pages.

Mar. 11, 2011 Response to State Intellectual Property Office of the People's Republic of China First Office Action dated Oct. 27, 2010 (untranslated) and amended claimes (translated), Application No. 200680042373.9, 48 pages.

EPO Extended European Search Report and Search Opinion dated Feb. 15, 2011 for Application No. 06839794.2-2415/1949621 PCT/US2006/060720; 10 pages.

EPO Mar. 4, 2011 Communication from EP Application No. 06839794.2; 1 page.

Sep. 6, 2011 Response to EPO Communication dated Mar. 4, 2011 from EP Application No. 06839794.2; 20 pages.

EPO Oct. 11, 2011 Communication from EP Application No. 06839794.2; 5 pages.

T-Joens, Y., "DHCP Reconfigure Extension," Network Working Group RFC 3203, Dec. 2001, 6 pages; http://tools.ietf.org/pdf/rfc3203.pdf.

* cited by examiner

TECHNIQUES FOR INSERTING INTERNET PROTOCOL SERVICES IN A BROADBAND ACCESS NETWORK

BACKGROUND OF THE INVENTION

1. Field of the Invention

The present invention relates to inserting Internet Protocol (IP) services in a broadband access network close to customer premises equipment; and in particular to providing, to customer premises equipment, multiple tap points in an Ethernet access network, which tap points are associated with corresponding multiple services.

2. Description of the Related Art

Networks of general purpose computer systems and special purpose hardware devices connected by external communication links are well known. The networks often include one or more network devices that facilitate the passage of information between the computer systems and devices. A network node is a network device, special purpose-device or computer system connected by the communication links.

Information is exchanged between network nodes according to one or more of many well known, new or still developing protocols. In this context, a protocol consists of a set of rules defining how the nodes interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

Communications between nodes are typically effected by exchanging discrete packets of data. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, often higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model.

On Ethernet network infrastructure, the physical (layer 1) header defines the electrical, mechanical and procedural mechanisms for proper capture of the Ethernet frame, but is not captured by a Media Access Controller.

The data-link header provides information for transmitting the packet over a particular physical link (i.e., a communication medium), such as a point-to-point link, Ethernet link, wireless link, optical link, etc. An intermediate network node typically contains multiple physical links with multiple different nodes. To that end, the data-link header may specify a pair of "source" and "destination" network interfaces that are connected by the physical link. A network interface contains the mechanical, electrical and signaling circuitry and logic used to couple a network node to one or more physical links. A network interface is often associated with a hardware-specific address, known as a media access control (MAC) address. Accordingly, the source and destination network interfaces in the data-link header are typically represented as source and destination MAC addresses. Source and destination MAC addresses are typically preserved across link layer bridges and switches. The data-link header may also store flow control, frame synchronization and error checking information used to manage data transmissions over the physical link.

The internetwork header provides information defining the source and destination address within the computer network. Notably, the path may span multiple physical links. The internetwork header may be formatted according to the Internet Protocol (IP), which specifies IP addresses of both a source and destination node at the end points of the logical path. Thus, the packet may "hop" from one routing node to another routing node along its logical path until it reaches the end node assigned to the destination IP address stored in the packet's internetwork header. After each hop, the source and destination MAC addresses in the packet's data-link header may be updated, as necessary. However, the source and destination IP addresses typically remain unchanged as the packet is transferred from link to link in the network.

Some protocols span the layers of the OSI Reference Model. For example, the Ethernet local area network (LAN) protocol includes both layer 1 and layer 2 information. The International Electrical and Electronics Engineers (IEEE) 802.3 protocol, an implementation of the Ethernet protocol, includes layer 1 information and some layer 2 information.

A common network service provided by service providers (SPs) involves connecting a device on a local area network with a network node that provides access to a wide area packet switched network (also called a packet-switched network core, or "core network"). For example, Internet service providers (ISPs) connect one or more nodes on a local network to the public Internet as the network core. The first leg of that communication is often over a circuit-switched network such as a narrowband plain old telephone system (POTS) that uses dedicated physical circuits, and such broadband networks as a cable network, a passive optical network (PON), or a digital subscriber line (DSL) network that uses persistent logical circuits that can share a common physical circuit. These circuits provide a direct physical link between the CPE and an intermediate network node of the service provider (SP).

In addition, for many ISPs, an access network lies between the physical link and the core network. For example, the access network connects a bank of circuit-switched network terminals, such as a POTS or DSL modem bank with a remote access server (RAS), such as a Broadband Remote Access Server (BRAS), which performs as an access gateway for the core network, such as the public Internet. The circuit-switched network terminals are controlled by an access module, such as a DSL Access Module (DSLAM). The access modules and access network are typically under the control of an access service provider (ASP) entity distinct from the ISP; while, the remote access server, such as the BRAS, is typically under the control of the ISP. Sometimes the ISP which contracts with a subscriber is called the Internet "retailer," and the ASP which contracts with multiple ISP to give their subscribers access is called the Internet "wholesaler."

Until recently, the access network provided by an ASP often was based on an Asynchronous Transfer Mode (ATM) infrastructure which uses permanent virtual circuits (PVCs) to carry data packet traffic, called ATM cell traffic. Point to point tunneling protocols were often used to carry data packets from the customer premises equipment to the BRAS across both the circuit-switched network and the access network. As the PVCs used were point to point, a point to point protocol like the Point-to-Point Protocol (PPP) was well suited to this environment.

Currently, there is a trend by ASPs to convert such ATM-based access networks to Ethernet-based access networks, which are capable of supporting freely routed data and shared (multicast or broadcast) packets as well as tunneled data packets forced to a particular access gateway like the BRAS. With the spread of Ethernet access networks, there is a desire by ASPs to offer some network services on the access network. The access networks are closer to the customer premises than core network, so network resource consumption, such as consumption of bandwidth and intermediate node processes at the remote access module and network core, is reduced by placing some common network services on the access network. In these circumstances, tunneled packets, because of their point to point nature, are no longer closely matched with the underlying transport as with an ATM access network.

The client-server model of computer process interaction is widely known and used. According to the client-server model, a client process sends a message including a request to a server process, and the server process responds by providing a service. The server process may also return a message with a response to the client process. Often the client process and server process execute on different devices, called hosts, and communicate via a network using one or more protocols for network communications. The term "server" is conventionally used to refer to the process that provides the service, or the host on which the process operates. Similarly, the term "client" is conventionally used to refer to the process that makes the request, or the host on which the process operates. As used herein, the terms "client" and "server" refer to the processes, rather than the host computers, unless otherwise clear from the context. In addition, the process performed by a server can be broken up to run as multiple servers on multiple hosts (sometimes called tiers) for reasons that include reliability, scalability, and redundancy, among other reasons.

Several approaches have been proposed to provide in the access network additional services beyond access to the core network. In general, a service is provided by a server or gateway to a cluster of multiple servers.

In some approaches, each server gets a unique IP address among all access networks connected to the core network. In some approaches, a unique logical address (e.g., an IP address) among all access networks connected to the network core is assigned not just to the remote access server, but instead to the access module which is the closest node on the access network to the customer's LAN. In some approaches, an access module is given multiple IP addresses, a different IP address for each virtual circuit with a different server on the access network. In some approaches, a combination of the other approaches is used.

A deficiency with these approaches is that they can create a large number of small ranges of IP addresses (called subnets). If you have point to point circuits or several smaller shared domains, you have smaller subnets. In IP the first address in the subnet, the zero subnet, and the last address in the subnet, the broadcast address cannot usually be used; so the smaller the subnets, the more addresses wasted. Also small subnets can lead to large routing tables if these subnets cannot be summarized on the network.

Approaches that employ separate point-to-point layer 2 tunneling to separate servers make it difficult to insert additional services. The access network has to be re-configured to provision additional point-to-point tunnels over separate permanent virtual circuits (PVCs) for the new services. In some approaches the multiple PVCs use one PVC to acquire an IP address for the other PVCs. However, this requires service segmentation in the access network, which makes it difficult to have a singe end node, such as a computer, work with both video and data services. An approach using multiple virtual circuits (VCs), involves separating traffic on the Ethernet access network (also called a "backhaul") using VLAN technology, where a service PVC maps to VLAN. This assumes a separate service gateway per service, each located in a different VLAN. However, on many networks there is a desire to have multiple service gateways in a single service aggregation device; thus, the same IP subnet must be terminated over multiple Ethernet interfaces on the service aggregation device. This is wasteful of the limited number of Ethernet interfaces on a device. Alternatively, one device in the home (e.g., a television set top box [STB] or personal computer [PC]) accesses multiple services; but, this would require multiple addresses on the home device.

In addition, point-to-point tunnels are inefficient for multi-point services, such as multi-cast and broadcast services. Separate logical circuits have to be configured for each destination, even though the same data is traversing the same physical links for much of the path. For example, a PPP connection from a DSLAM port (which corresponds to a house) to the BRAS, carries television video content from a first programming source. Another DSLAM port to a neighboring also carries video content from the same programming source. Because these are point to point circuits and the service insertion is at the BRAS, the same television video content broadcast would travel twice down the same physical links. It would be more efficient to send the television video content once and then duplicate it at the DSLAM, but this requires that the two home devices can access the same television video content stream.

Based on the foregoing, there is a clear need for techniques that insert services on access networks closer to customer premises without the disadvantages of prior art approaches. In particular, there is a need for techniques that insert services on the access networks and that utilize the shared media capabilities of the Ethernet protocol or do not require separate IP addresses on the same device for separate services.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Techniques are described for providing additional services on an access network. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments of the invention are described below in the context of an Ethernet access network between a DSL physical link to customer premises equipment (CPE) and an IP core packet-switched network, but the invention is not limited to this context. In other embodiments, the methods are applied in other access networks that connect other access modules, such as optical access modules, to one or more remote access servers on one or more different core networks, such as a corporate private core network. In other embodiments, these methods are applied to any packet network where services are located at different destinations.

1.0 Access Network Overview

Figure 1A:
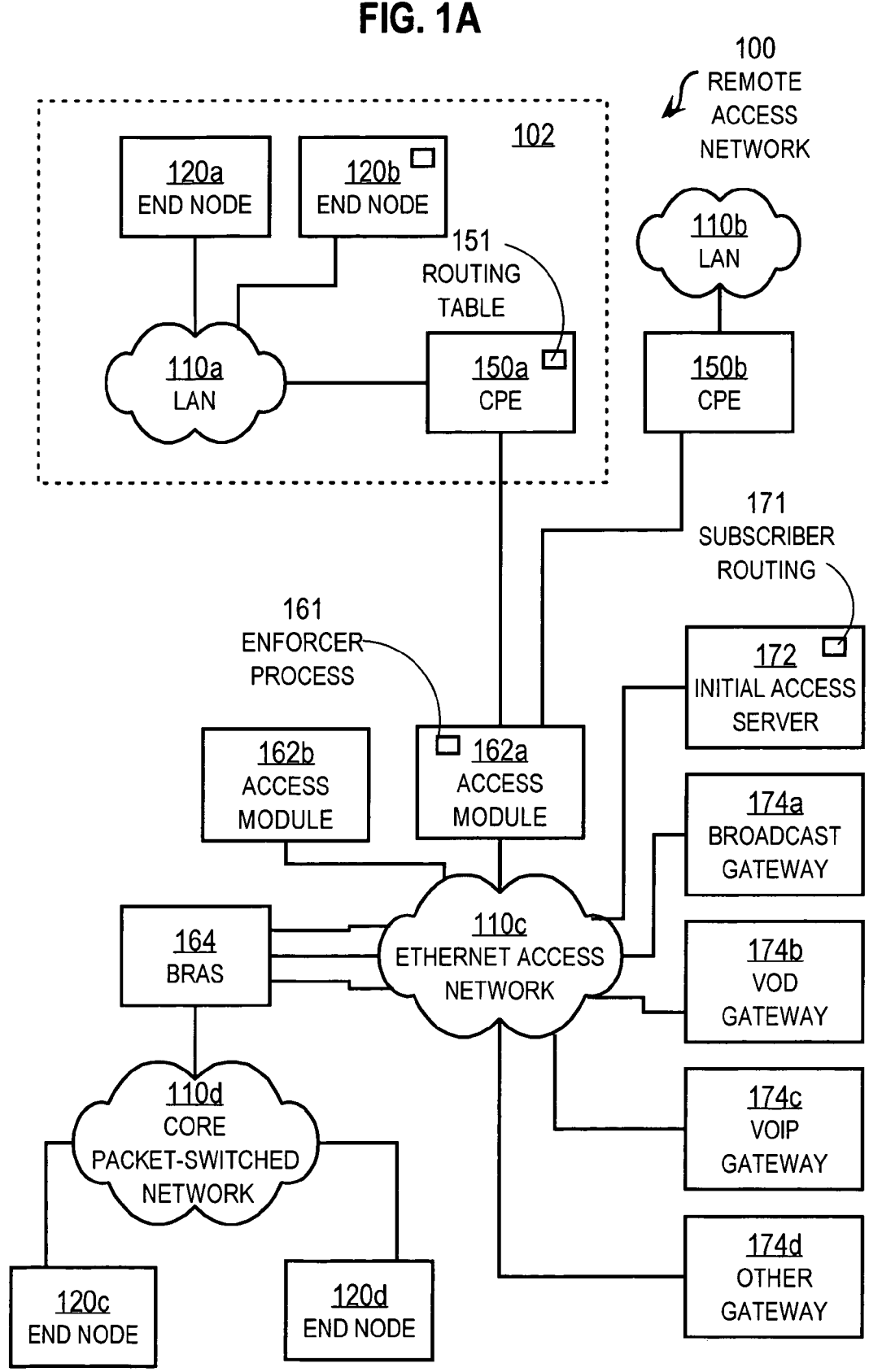
FIG. 1A is a block diagram that illustrates a network that provides remote access to a core packet-switched network for communications between distant end nodes, according to an embodiment.

FIG. 1A is a block diagram that illustrates a network that provides remote access to a core packet-switched network for communications between distant end nodes, according to an embodiment. An internet is a geographically distributed collection of interconnected sub-networks (e.g., sub-networks 110a, 110b, 110c, 110d collectively referenced hereinafter as sub-networks 110) for transporting data between nodes, such as computers, personal digital assistants and cell phones. A local area network (LAN) 110a is an example of such a sub-network. The network's topology is defined by an arrangement of end nodes (e.g., end nodes 120a, 120b, 120c, 120d, collectively referenced hereinafter as end nodes 120) that communicate with one another, typically through one or more intermediate network nodes, such as a router or switch, that facilitates routing data between end nodes 120 on different sub-networks. As used herein, an end node 120 is a node that is configured to originate or terminate communications over the network. In contrast, an intermediate network node facilitates the passage of data between end nodes. Intermediate network nodes depicted in FIG. 1A include customer premises equipment (CPE) 150a, 150b, access modules 162a, 162b, and Broadband Remote Access Server (BRAS) node 164.

Four sub-networks 110 that are typically involved in remote access are depicted in FIG. 1A. Each sub-network 110 may includes zero or more intermediate network nodes. A core packet-switched network 110d is the target for remote access by users at a customer site 102.

To access core network 110d, a LAN 110a is connected to CPE 150a which serves as a bridge to an access module 162a. In an illustrated embodiment, LAN 110a uses Ethernet infrastructure. Although the customer site 102 includes an Ethernet LAN 110a and two end nodes 120a, 120b, in other embodiments more or fewer end nodes 120 are connected to more or fewer or different LANs 110, such as one or more LANs using Asynchronous Transfer Mode (ATM) infrastructure.

The link between the CPE 150 and its corresponding access module is a physical layer (layer 1) connection. In some cases CPE is a telephone modem using acoustic frequency electrical signals over a low-bandwidth legacy telephone system. In some cases CPE is a cable modem using high frequency electrical signals over a cable system. In some cases CPE is an optical modem using optical signals over a fiber optic system. In some cases CPE is a wireless modem using wireless signals to distributed antennas. In an illustrated embodiment, CPE 150a is a digital subscriber line (DSL) modem for establishing a high bandwidth DSL connection over a telephone wire circuit-switched network. According to some embodiments of the invention, the CPE includes a routing table 151 for determining layer 3 addresses, such as IP addresses, of intermediate network nodes that handle traffic for ranges of layer 3 destinations. The use of routing table 151 is described in more detail in a later section. In an illustrated embodiment, the protocol used for communications over the link from CPE 150a to access module 162a is ATM encapsulated in DSL (ATM/DSL).

Although two CPE 150a, 150b are depicted connected to access module 162a, in other embodiments more or fewer CPE are connected to access module 162a. In an illustrated embodiment, access module 162a is a DSL Access Module (DSLAM). In other embodiments, access module 162a is a controller for a bank of low-bandwidth modems or a cable or optical or wireless access module. According to some embodiments of the invention, access module 162a includes an enforcer process 161, as described in more detail in a later section with reference to FIG. 4.

An access service provider (ASP) typically maintains several access modules 162a, 162b (collectively referenced hereinafter as a module 162) and an access network 110c for connection to the core network 110d through a remote access server, such as Broadband Remote Access Server (BRAS) 164 on an intermediate network node. In many former access networks, the access network is based on an ATM infrastructure, and the base communication protocol is ATM. In embodiments that use techniques of the current invention, the access network 110c is based on an infrastructure that supports layer 2 switching and broadcasts. In the illustrated embodiment, the access network is an Ethernet access network 110c based on Ethernet infrastructure. Although one BRAS 164 in one core network is depicted in FIG. 1A, in other embodiments, more remote access servers connected to the same or different packet-switched core networks are connected to access network 110c.

An Internet Service Provider (ISP) typically maintains a gateway server (not shown) on the core network 110d for processing all traffic from its subscribers using a layer 3 protocol such as IP. Multiple ISPs may contract with the same ASP for use of the same access network 110c. Each such ISP maintains its own gateway server (not shown) on the core network 110d.

According to various embodiments of the current invention, one or more gateway servers are provided on access network 110c for supporting ancillary services other than access to core network 110d. In the illustrated embodiment, the gateway servers for ancillary services (collectively referenced hereinafter as ancillary gateways 174) include broadcast gateway 174a for audio or video or other broadcast data, video on demand (VOD) gateway 174b, voice over IP (VOIP) gateway 174c, and other gateway 174d, such as a gateway that provides a layer 2 virtual private network (L2VPN). It is understood that an ancillary gateway 174 can be a single server, or a gateway to a cluster of multiple servers with or without a load balancer for distributing traffic among the cluster of servers.

Also depicted in FIG. 1A is an initial access server 172, which is a primary server that a CPE is configured to contact to receive configuration data for performing layer 3 routing. For example, in some embodiments, initial access server 172 is a Dynamic Host Configuration Protocol (DHCP) server. The DHCP protocol is described in request for comment (RFC) 3442 of the Internet Engineering Task Force (IETF) and is available along with other RFCs from the IETF at the World Wide Web domain ietf.org. The entire contents of RFC 3442, entitled "The Classless Static Route Option for Dynamic Host Configuration Protocol (DHCP) version 4" are hereby incorporated by reference as if fully set forth herein. In some embodiments, the initial access server 172 is a routing information protocol (RIP) server. The RIP protocol is described in RFC 2453, the entire contents of which are hereby incorporated by reference as if fully set forth herein.

Although, the initial access server 172 is connected to the access network 110c in the illustrated embodiment, in other embodiments the initial access server 172 is connected to another sub-network, such as the core network 110d. In some embodiments, the initial access server 172 is included in, or shares a host with, the BRAS 164. The initial access server 172 includes subscriber routing data 171, which includes data that indicates which of the ancillary gateways 174 can be used by a particular subscriber associated with a particular customer site and CPE.

According to embodiments of the invention, a CPE uses special routing information in routing table 151 to direct data packets to an ancillary gateway 174 connected to the access network 110c instead of to the RAS, such as BRAS 164. The routing table 151 includes layer 3 addresses (e.g., IP addresses) for one or more of the ancillary gateways 174 on the access network 110c. In some embodiments, the routing table 151 is statically configured. In an illustrated embodiment, data for the routing table 151 is customer specific and is dynamically configured based on subscriber routing data 171 in the initial access server 172, as described in more detail in a later section with reference to FIG. 4.

In some embodiments, the data packets from the CPE are still included in tunneled traffic, e.g. PPP traffic, to an access module; however, the access module (e.g., 162a) extracts the PPP payload and forwards it according to a layer 2 protocol, e.g., Ethernet. For example, access module 162a extracts a PPP data plane payload from CPE 150a, determines a MAC destination address for one of the ancillary gateways 174 and forwards the PPP data plane payload according to that MAC destination. In the illustrated embodiment, an IP datagram arrives from the CPE over a direct link and is not encapsulated in a tunneling protocol like PPP.

In some embodiments, an access module 160 includes the enforcer process 161 that ensures the MAC destination is consistent with the configuration data for the CPE, such as the subscriber routing information 171 sent from the initial access server 172. The enforcer resolves the IP addresses of the ancillary servers in the routing information to the corresponding MAC addresses using any method known in the art, e.g., the Address Resolution Protocol (ARP). Thus, the enforcer process 161 makes sure the CPE does not receive services for which the customer associated with the CPE is not a subscriber. The workings of the enforcer process 161 are described in a later section with reference to FIG. 4.

Figure 1B:
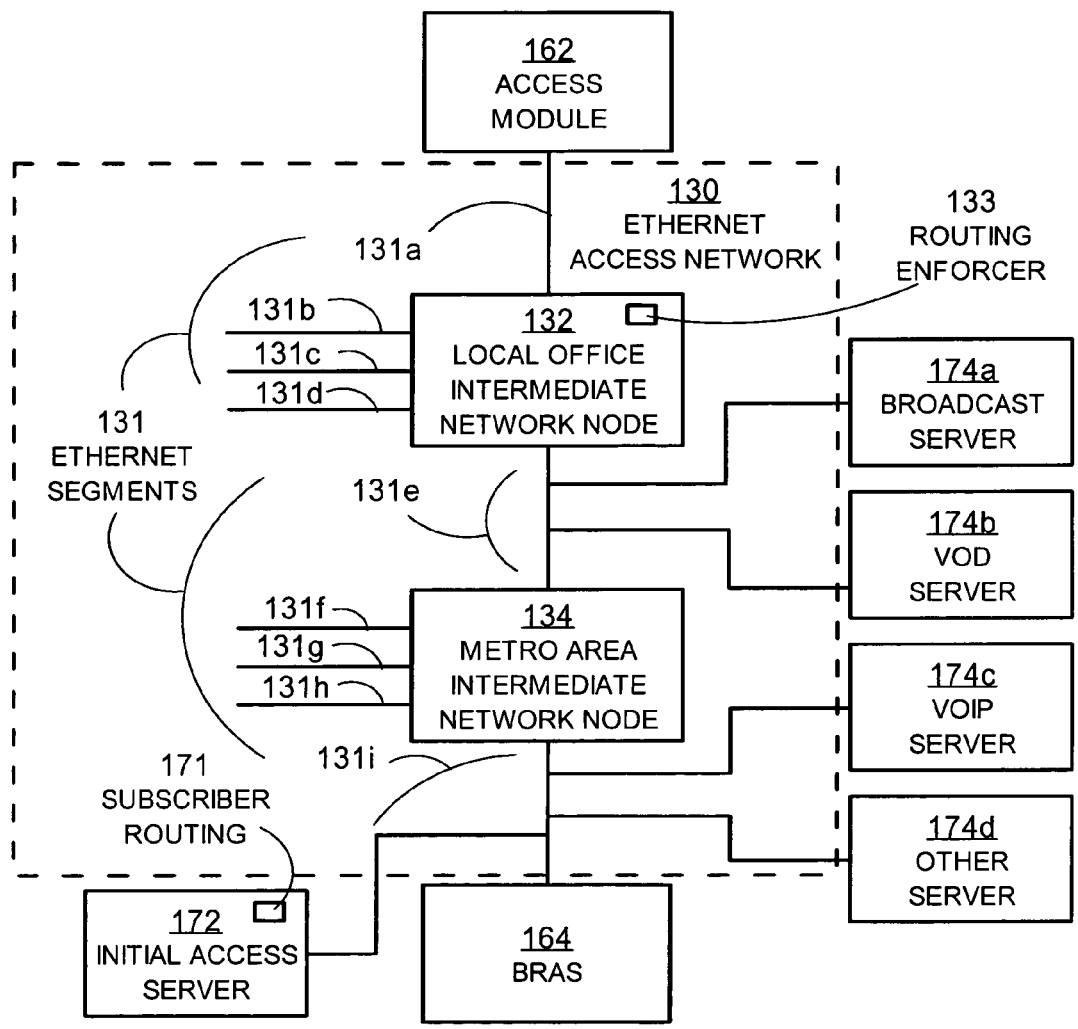
FIG. 1B is a block diagram that illustrates in more detail an Ethernet access network component of the network depicted in FIG. 1A, according to an embodiment.

FIG. 1B is a block diagram that illustrates in more detail an Ethernet access network component of the network depicted in FIG. 1A, according to an embodiment 130. In this embodiment, the Ethernet access network 130 connects an access module 162 to BRAS 164. The Ethernet access network 130 includes two intermediate network nodes, a local office intermediate network node 132 (also called "local office node" 132) and a metro area intermediate network node 134 (also called a "metro area node" 134). In other embodiments, more or fewer intermediate network nodes are included in Ethernet access network 110c. In the illustrated embodiment, the intermediate network nodes are Ethernet bridges or switches that preserve MAC addresses in the data packets they transmit.

The Ethernet access network 130 includes multiple Ethernet segments 131, which are portions of an Ethernet between intermediate network nodes. All messages on an Ethernet segment are seen by all nodes connected to that segment and therefore an Ethernet segment is useful for multi-cast and broadcast data packet traffic. A particular recipient is indicated by a MAC address in the layer 2 header, and a receiving node ignores all traffic directed to a particular MAC that is not the receiving node's own MAC or a special MAC for broadcast or multi-cast traffic.

In the illustrated embodiment, segment 131a connects access module 162 to the local office node 132, and segments 131b, 131c, 131d connect other access modules (not shown) to local office node 132. Segment 131e connects the local office node 132 to metro area node 134, and segments 131f, 131g, 131h connect other local office nodes (not shown) to metro area node 134. Segment 131i connects the metro area node 134 to BRAS 164, and other segments (not shown) connect other metro area nodes (not shown) to BRAS 164. The illustrated segments 131 show how Ethernet segments are used to scale up to a large number of customer sites. For example, in some access networks, there are a few customer sites per access module, dozens of access modules per local office node, dozens of local offices per metro area, and a few metro area nodes connected to a BRAS; thus a single BRAS handles traffic from thousands of customer sites.

According to embodiments of the invention, ancillary services are pushed closer to the access modules, and therefore closer to the customer sites. In the illustrated embodiment, the broadcast gateway 174a and VOD gateway 174b are connected to network segment 131e. Similarly, VoIP gateway 174c and other gateway 174d are connected to network segment 131i. The initial access server 172 is also connected to network segment 131i. In other embodiments, one or more of the gateways are located on other segments of the access network.

In the circuit switched scenario of prior approaches the tunnels ensured separation of traffic. In an Ethernet/DSL scenario the request to access multicast/broadcast traffic is intercepted on the DSLAM (e.g., access module 162a), and based on either configured or dynamic policy, forwarding of the broadcast is allowed from the segment (e.g., 131a) connected to the access module (e.g., 162) to that user (e.g., via CPE 150a). The forwarding is based on the Internet Group Management Protocol (IGMP) and the ability of the access module (162) to snoop IGMP and allow or deny traffic. The use of IP multicasting in TCP/IP networks is defined as a TCP/IP standard in RFC 1112, "Internet Group Management Protocol (IGMP)." In addition to defining address and host extensions for how IP hosts support multicasting, this RFC also defines the Internet Group Management Protocol (IGMP) version 1. RFC 2236 defines IGMP version 2. Both versions of IGMP provide a protocol to exchange and update information about host membership in specific multicast groups. The entire contents of RFC 1112, RFC 2236 are herby incorporated by reference as if fully set forth herein. IGMP version 3, described in the Internet draft entitled "Internet Group Management Protocol, version 3," allows hosts to specify interest in receiving multicast traffic from specified sources or from all but a specific set of sources.

In this embodiment, the routing enforcer process 161 is executed on local office node 132, instead of on access module 162. In other embodiments, the routing enforcer process 161 is executed on any node that is in every path between an access module and an ancillary gateway 174.

2.0 Access Network Routing Data

Figure 2:
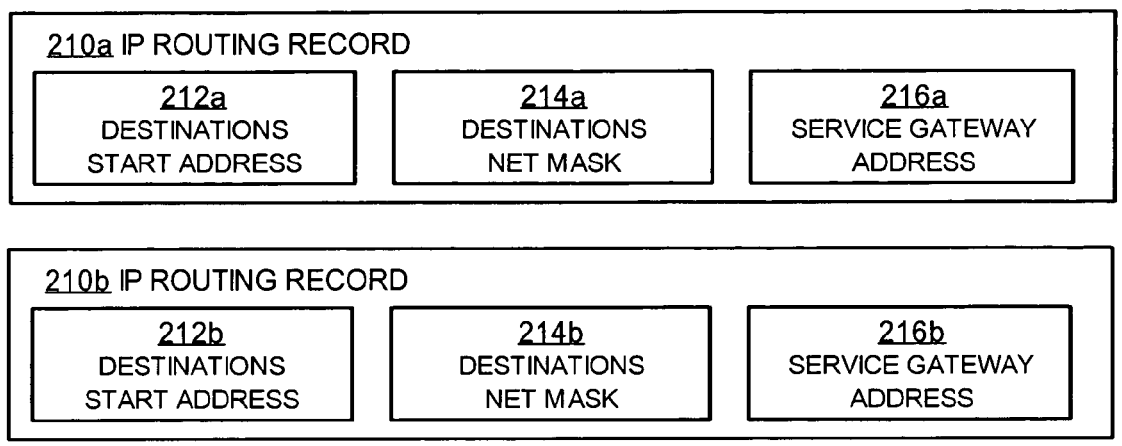
FIG. 2 is a block diagram that illustrates a data structure for storing routing information on customer premises equipment, according to an embodiment.

FIG. 2 is a block diagram that illustrates a data structure 200 for storing routing information on customer premises equipment, according to an embodiment. In other embodiments, other routing tables, including other conventional routing tables, are used. The data structure 200 includes multiple IP routing records 210a, 210b and others indicated by ellipsis 219, collectively referenced hereinafter as IP routing records 210. Routing records 210a, 210b each includes a destination range start address field 212a, 212b, respectively (collectively referenced hereinafter as destination start field 212). Routing records 210a, 210b each includes a destination net mask field 214a, 214b, respectively (collectively referenced hereinafter as destination net mask field 214). Routing records 210a, 210b each includes a service gateway address field 216a, 216b, respectively (collectively referenced hereinafter as gateway address field 216). As is well known in the art of IP routing, a range of contiguous IP addresses can be indicated by a starting IP address and a mask. For example, an IPv4 address is a four octet value, where an octet is eight binary digits (bits). An IPv4 address is often represented by four decimal values between 0 and 255 separated by periods. A mask is a four octet value that has zero at bits that can change within the range of addresses and a value of 1 at bits that can not change within the range of addresses, but must match the bits in the starting address.

According to many embodiments of the invention, the routing data structure 200 is stored at CPE to determine a range of IP addresses to associate with each of one or more ancillary gateways 174. For example, a variety of video on demand servers with a corresponding variety of IP addresses are reached through VOD gateway 174b with a particular IP address on the Ethernet access network 130. Thus the IP addresses of all those VOD severs are associated with the IP address of gateway 174b, which acts as a gateway for those servers. The routing information indicates all traffic to any of those VOD servers are directed first to VOD gateway 174b. If the set of VOD servers have IP addresses that are not contiguous, then multiple records are inserted into data structure 200, one for each contiguous set of addresses (called a subnet).

For some services such as video that do not allow access from the internet, private addresses are used in the homes and on the server for this service in some embodiments. These private addresses are not advertised outside of the access network 110c. This allows the same addresses to be used in other access networks. Thus valuable network address space is conserved.

In some embodiments, a data structure similar or identical to routing data structure 200 is used by the routing enforcer process 161, as described in more detail in a later section.

3.0 Method for Inserting Services In Access Network

A method for inserting services in an access network involves configuring a CPE with routing data that indicates the range of layer 3 addresses for a service and a layer 3 next hop for that service within the access network. In various embodiments, the CPE is statically configured, or dynamically configured, e.g., by using DHCP or RIP. The CPE resolves the IP address of the gateway as a corresponding MAC address of the next hop using methods well known in the art, such as ARP. In various embodiments PPP tunnels are generated only to a network node in the access network, such as to the access module, rather than to the remote access server or BRAS. In some embodiments, an enforcer process is found at the termination point of the PPP or along the PPP path. In some embodiments, there are no PPP tunnels used between CPEs 150 and Access modules 160. In some embodiments, the enforcer process ensures that the MAC address of the next hop is consistent with the CPE configuration data (e.g., by also using ARP to resolve the IP address of the gateway as a corresponding next hop MAC address); the enforcer prevents malicious use by a CPE of MAC addresses for gateways that dispense services to which the CPE has not subscribed. In various embodiments, new methods are invoked at either the initial access server or an enforcer process, or both.

3.1 Method for Initial Communication with Access Network

Figure 3:
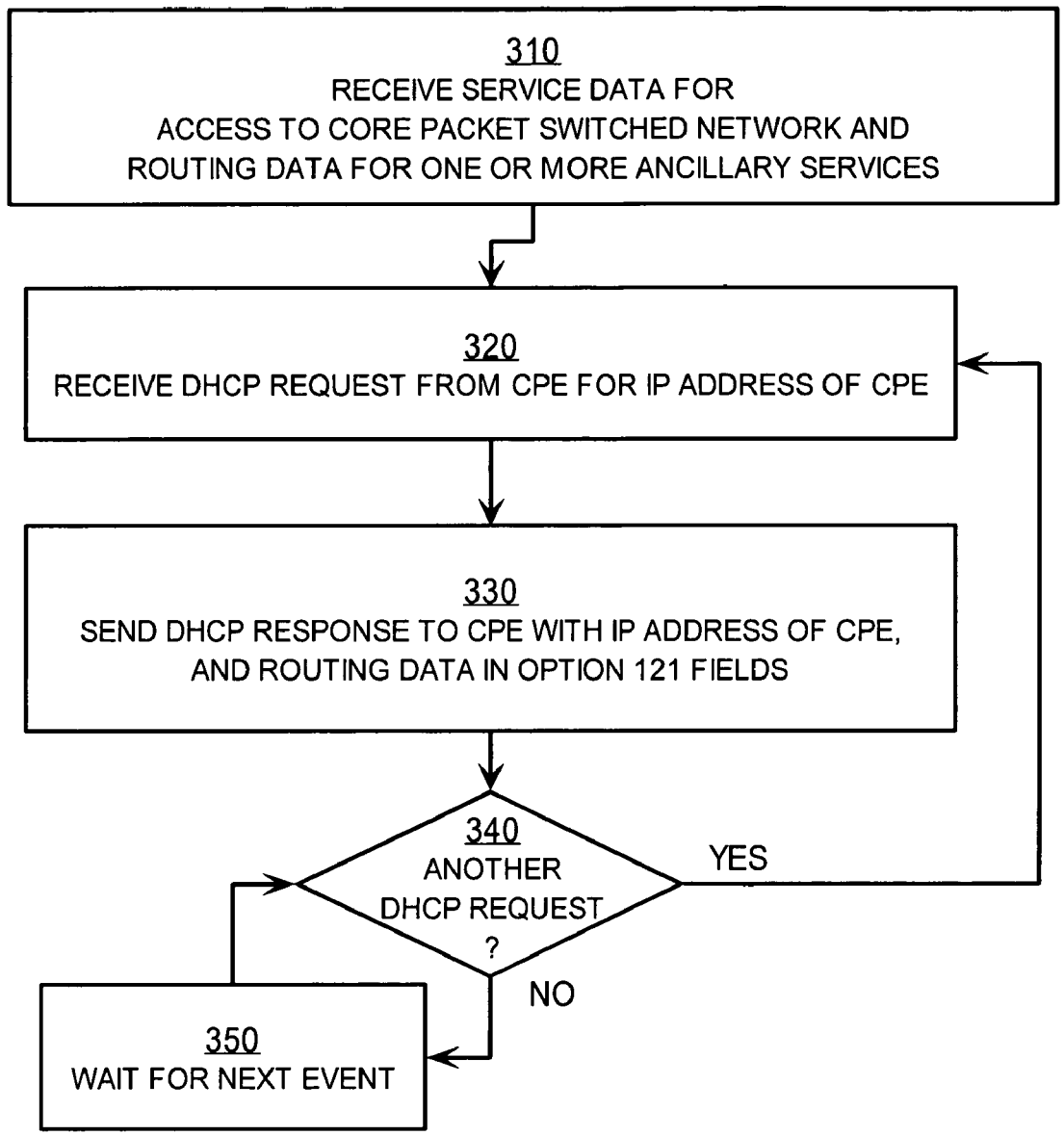
FIG. 3 is a flow diagram that illustrates at a high level a method for providing routing information for services on an access network, according to an embodiment.
Figure 4:
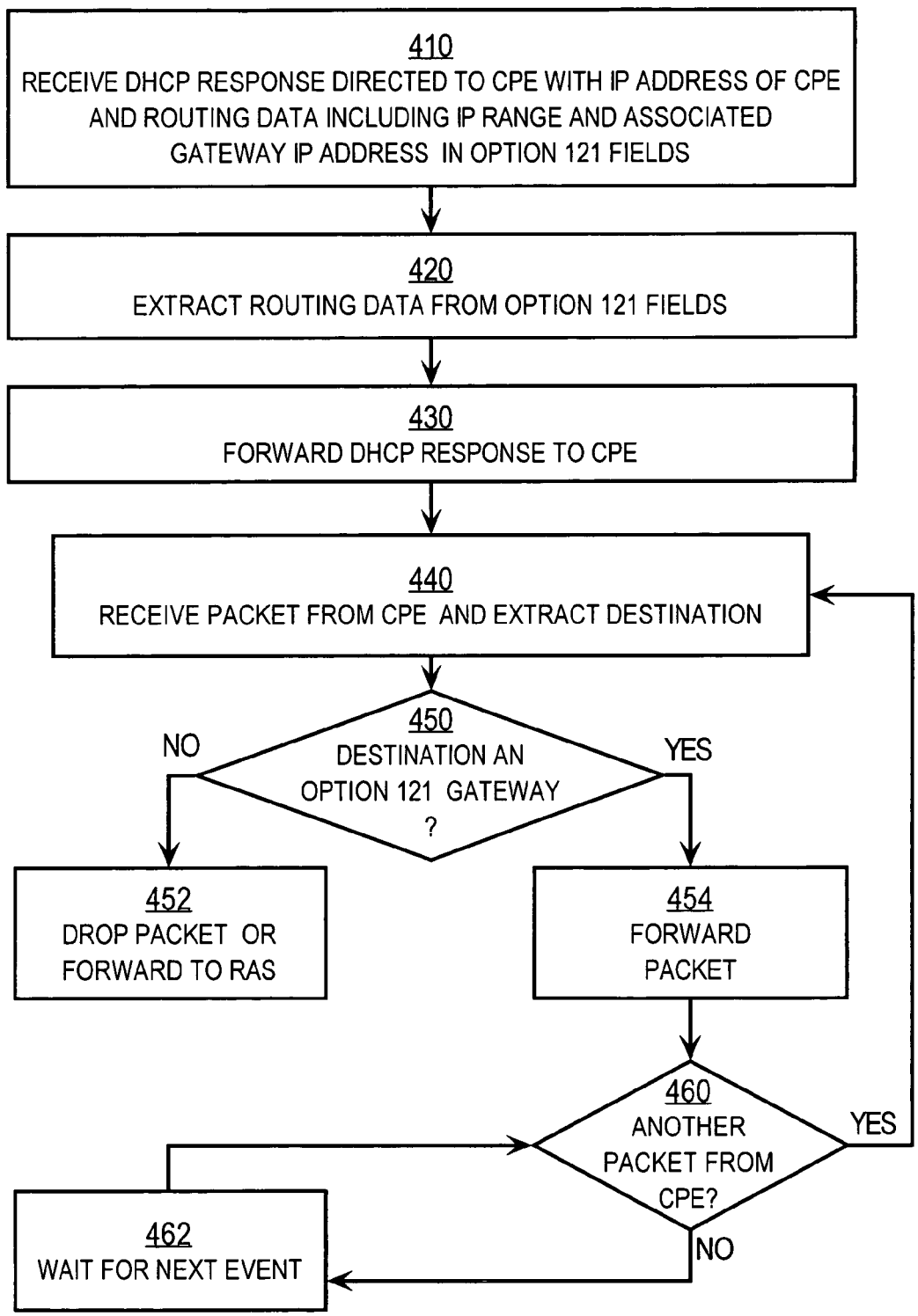
FIG. 4 is a flow diagram that illustrates at a high level a method for enforcing routing for services on an access network, according to an embodiment.

FIG. 3 is a flow diagram that illustrates at a high level a method 300 for providing routing information for services on an access network at an initial access server, according to an embodiment. Although steps are shown in FIG. 3 and FIG. 4 in a particular order for purposes of illustration, in other embodiments one or more steps are performed in a different order or overlapping in time or are omitted or changed in some combination of ways. In an illustrated embodiment, the initial access server is a DHCP server.

In step 310, service data is received that describes the services available on the access network, including access to one or more core networks, and the services to which a customer subscribes. Any method may be used to receive this information, including, but not limited to, predefined data stored within source code or in files stored with the executable code ("default values") or in files or a database accessible to the process, manual input either in response to prompts from the process or independently of prompts, or from data included in a message sent to the process by another server or from a client process, either in response to a request or unsolicited.

Example service data is shown in Table 1 and Table 2.

TABLE 1

Example service data indicating ancillary services on access network.

| Service | Gateway address | Destinations that provide service: start address | Destinations that provide service: net mask |
|---|---|---|---|
| BRAS 164 | 68.34.0.1 | 0.0.0.0 | 0.0.0.0 |
| Broadcast & multi-cast video (gateway 174a) | 192.168.22.1 | 192.168.22.0 | 255.255.255.0 |

TABLE 1-continued

Example service data indicating ancillary services on access network.

| Service | Gateway address | Destinations that provide service: start address | Destinations that provide service: net mask |
|---|---|---|---|
| Video on demand (gateway 174b) | 192.168.24.1 | 192.168.24.0 | 255.255.255.0 |
| Voice over IP (gateway 174c) | 10.10.0.20 | 10.10.0.0 | 255.255.0.0 |
| Other, e.g., Ethernet layer 2 VPN (gateway 174d) | 10.10.1.1 | 10.10.1.0 | 255.255.0.0 |

TABLE 2

Example service data indicating subscriber services

| Subscriber ID | Subscriber's CPE IP address | BRAS | Broadcast multicast | VOD | VoIP | Other |
|---|---|---|---|---|---|---|
| X1 | — | Yes | Yes | No | Yes | No |
| X2 | — | Yes | No | No | No | No |
| X3 | — | Yes | No | No | No | No |

In step 320, a request for configuration data is received from a CPE. In the illustrated embodiment, a DHCP request is received for configuration data, including a request for an IP address for the CPE. For example a DHCP request is received from CPE that includes a subscriber ID of X1.

In step 330, a response from the initial access server with configuration data is sent to the CPE. In the illustrated embodiment, a DHCP response is sent to the CPE. The conventional DHCP response includes an IP address for the CPE and an IP address for one or more servers, such as an address for a domain name server (DNS) and the remote access server, e.g., an IP address for the BRAS.

According to several embodiments, during step 330, DHCP option 121 fields are included in the DHCP response. Based on the subscriber ID of "X1" and the service data in Table 2, the DHCP server determines that broadcast and VoIP services are to be allowed for the CPE making the DHCP request. Therefore, the DHCP response includes the IP addresses of gateways 174a and 174c as given in Table 1 which function as gateways for a cluster of servers that provide the subscribed service. A range of addresses for the cluster of servers that provide each service, such as listed in the last two columns of Table 1, are also included in the DHCP option 121 response.

Based on the DHCP 121 option, the receiving CPE forms a routing table 151 with the information for the subscribed services, as shown in Table 3. This information will cause the CPE to direct requests for broadcast services at addresses 192.168.22.1 through 192.168.22.255 to the broadcast gateway 174a; and direct requests for VoIP services at addresses 10.10.0.20 through 10.10.255.255 to VoIP gateway 174c; and direct all other requests to the BRAS 164. In effect option 121 supplies a routing table to the CPE, so the CPE has a destination and a next hop in the option. The CPE resolves the layer 2 MAC address by the Address Resolution Protocol (ARP), which maps IP network addresses to the hardware addresses used by a data link protocol. The protocol operates below the network layer 3 when IPv4 is used over Ethernet. ARP is described in RFC 826, the entire contents of which are herby incorporated by reference as if fully set forth herein. When a packet is sent to a destination, the destination is looked up in the routing/forwarding table. If there is an explicit match or the destination is in an explicit range, then the corresponding gateway is used by sending a data packet to the next hop MAC address that corresponds to that gateway. If there is no explicit match and the destination is not in an explicit range, then the default gateway (e.g., the BRAS in the first row of Table 3) is used.

TABLE 3

Example routing table on CPE based on DHCP option 121 data.

| Destinations start address | Destinations net mask | Gateway address |
|---|---|---|
| 0.0.0.0 | 0.0.0.0 | 68.34.0.1 |
| 192.168.22.0 | 255.255.255.0 | 192.168.22.1 |
| 10.10.0.0 | 255.255.0.0 | 10.10.0.20 |

In some embodiments, step 320 is omitted. For example, when a service gateway or address range changes, new DHCP option 121 data with the changed routing data can be forced on the CPE during step 330 without waiting for a request. This can be done by sending a DHCP FORCE_RENEW message, as described in RFC3203, during step 330.

In step 340, the initial access server determines whether there is another request. In the illustrated embodiment, the DHCP server determines whether another DHCP request is received. If so, control passes back to step 320. If not, control passes to step 350 to wait for the next event processed by the initial access server.

Using DHCP option 121, an ASP advertises ancillary services available to a subscriber with a CPE.

3.2 Method for Enforcing Routing on Access Network

FIG. 4 is a flow diagram that illustrates at a high level a method 400 for enforcing routing for services on an access network, according to an embodiment. This method is executed by a routing enforcer process, e.g., enforcer process 161. The enforcer process operates on any network node that is disposed on every path from the CPE to any ancillary gateway 174 in the access network 110c. In some embodiments, the enforcer process 161 executes on an access node, e.g., access module 162a. In an illustrated embodiment, the enforcer process 161 executes on the local office intermediate network node 132. In some embodiments, the enforcer process also operates on a backup device that is pressed into service if the original host fails for any reason.

In step 410, configuration data for the CPE is received in a message from the initial access server. For example, a DHCP response message with option 121 data that describes the routing table for the CPE, and sent in step 330, described above, is received from the DHCP server directed to the CPE, during step 410.

In step 420, the routing data in the configuration message is extracted for use by the enforcer process. The data may be stored locally or remotely in any manner, including flat files or in a database. In an illustrated embodiment, step 420 includes resolving IP addresses of the gateway servers to determine the MAC addresses for the next hop.

In step 430, the configuration message is forwarded to the CPE. In the illustrated embodiment, the DHCP message is forwarded to the CPE. For example, a DHCP message with the data of Table 3 in an option 121 message from initial access server 172 is forwarded by local office intermediate network node 132 to CPE 150*a* by way of access module 162*a*.

In some embodiments, steps 410, 420, 430 are omitted, and both the CPE and the enforcing process are statically configured with the routing data, e.g., with the data depicted in Table 3.

In step 440 a data packet is received from the CPE. The routing enforcer process 161 extracts from the data packet the MAC destination address In step 450, it is determined whether the MAC destination is among the MAC addresses corresponding to the service gateway IP addresses that the CPE was configured for. For example, it is determined in step 450 whether the MAC destination corresponds to one of the IP addresses in the third column of table 3. If not, then the CPE is attempting to reach a service that it did not subscribe to, and control passes to step 452 to drop the packet and not process it further. In some embodiments, the packet is forwarded to the default remote access server (RAS) such as the BRAS 164

If it is determined in step 450 that the MAC destination corresponds to an IP address among the service gateway addresses that the CPE was configured for, then the packet is forwarded to the gateway. Thus the packet is directed to one of the gateways for which the CPE was configured. The packet is also received by other nodes on the same segment, and ignored unless that node is involved in a multi-cast or broadcast.

In step 460, the routing enforcer process determines whether there is another data packet from the CPE. If so, control passes back to step 440. If not, control passes to step 462 to wait for the next event processed by the routing enforcer process.

As shown in method 300, using DHCP option 121, an ASP advertises ancillary services available to a subscriber with a CPE. Using the method 400, a customer who has not subscribed to one of the ancillary services does not have layer 3 access to those severs or their gateways. The combination provides both dynamic provisioning of CPE for ancillary services and protection from attempts to steal those services.

In some embodiments, access nodes snoop the request for access to a broadcast (IGMP snooping) and compare this request against an internal table (called a white list) to see if the user is allowed access. In some embodiments, the comparison is done dynamically with a request to a policy server to determine whether the user is entitled to access this stream.

In some embodiments, the routing data is sent not only to a CPE, and the enforcer process enroute to the CPE, but also to a backup enforcer process, such as on a backup access module, to be employed if the initial enforcer process is unable to function, such as if the access module fails.

4.0 Implementation Mechanisms—Hardware Overview

Figure 5:
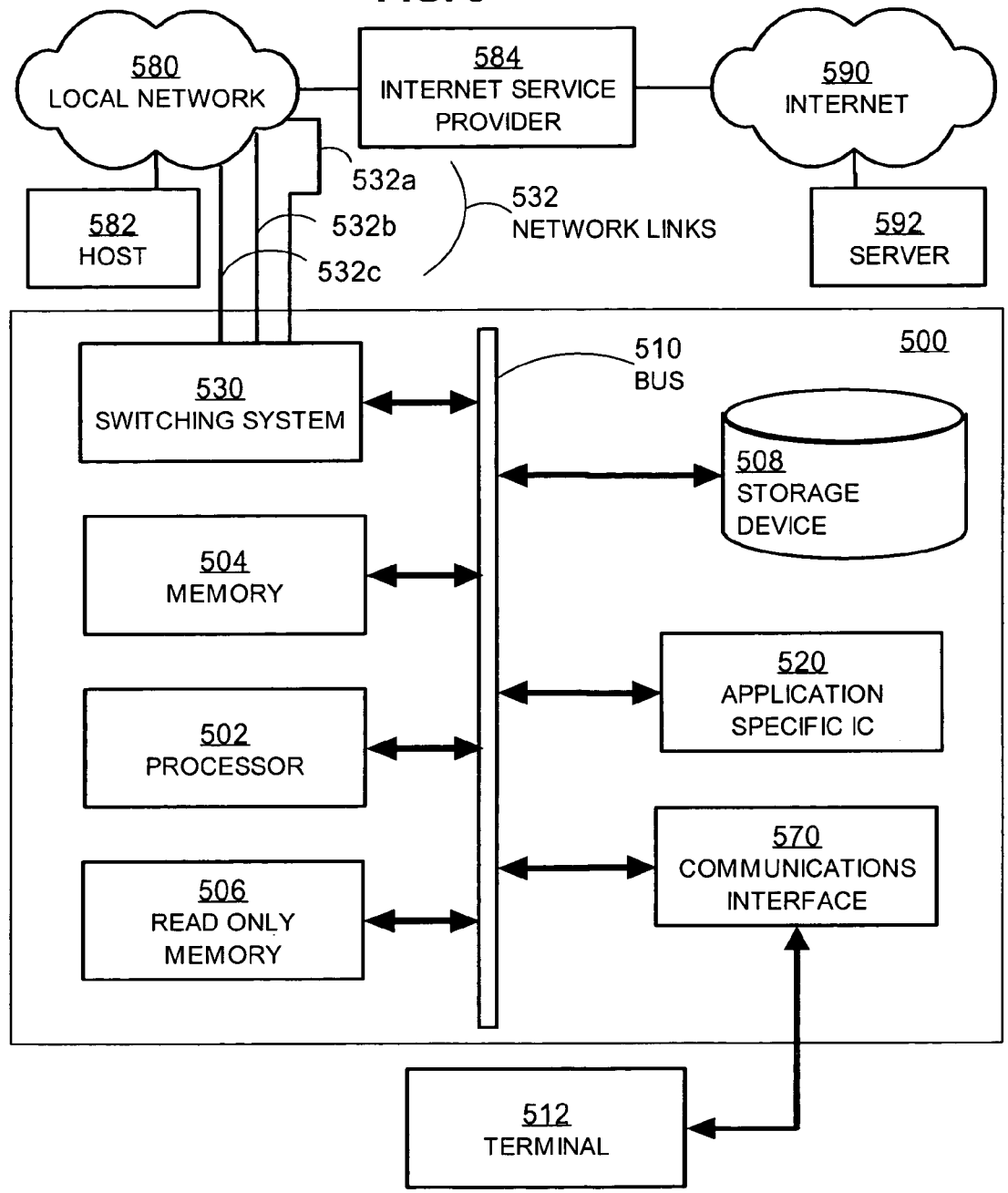
FIG. 5 is a block diagram that illustrates a computer system upon which an embodiment of the invention may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitute computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 510 for use by the processor from an external terminal 512, such as a terminal with a keyboard containing alphanumeric keys operated by a human user, or a sensor. A sensor detects conditions in its vicinity and transforms those detections into signals compatible with the signals used to represent information in computer system 500. Other external components of terminal 512 coupled to bus 510, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 512. In some embodiments, terminal 512 is omitted.

Computer system 500 also includes one or more instances of a communications interface 570 coupled to bus 510. Communication interface 570 provides a two-way communication coupling to a variety of external devices that operate with their own processors, such as printers, scanners, external disks, and terminal 512. Firmware or software running in the computer system 500 provides a terminal interface or character-based command interface so that external commands can be given to the computer system. For example, communication interface 570 may be a parallel port or a serial port such as an RS-232 or RS-422 interface, or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends and receives electrical, acoustic or electromagnetic signals, including infrared and optical signals, which carry information streams, such as digital data. Such signals are examples of carrier waves.

In the illustrated embodiment, special purpose hardware, such as an application specific integrated circuit (IC) 520, is coupled to bus 510. The special purpose hardware is configured to perform operations not performed by processor 502 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 500 includes switching system 530 as special purpose hardware for switching information for flow over a network. Switching system 530 typically includes multiple communications interfaces, such as communications interface 570, for coupling to multiple other devices. In general, each coupling is with a network link 532 that is connected to another device in or attached to a network, such as local network 580 in the illustrated embodiment, to which a variety of external devices with their own processors are connected. In some embodiments an input interface or an output interface or both are linked to each of one or more external network elements. Although three network links 532a, 532b, 532c are included in network links 532 in the illustrated embodiment, in other embodiments, more or fewer links are connected to switching system 530. Network links 532 typically provides information communication through one or more networks to other devices that use or process the information. For example, network link 532b may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides routing information for use with switching system 530.

The switching system 530 includes logic and circuitry configured to perform switching functions associated with passing information among elements of network 580, including passing information received along one network link, e.g. 532a, as output on the same or different network link, e.g., 532c. The switching system 530 switches information traffic arriving on an input interface to an output interface according to pre-determined protocols and conventions that are well known. In some embodiments, switching system 530 includes its own processor and memory to perform some of the switching functions in software. In some embodiments, switching system 530 relies on processor 502, memory 504, ROM 506, storage 508, or some combination, to perform one or more switching functions in software. For example, switching system 530, in cooperation with processor 504 implementing a particular protocol, can determine a destination of a packet of data arriving on input interface on link 532a and send it to the correct destination using output interface on link 532c. The destinations may include host 582, server 592, other terminal devices connected to local network 580 or Internet 590, or other routing and switching devices in local network 580 or Internet 590.

The invention is related to the use of computer system 500 for implementing the techniques described herein. According to one embodiment of the invention, those techniques are performed by computer system 500 in response to processor 502 executing one or more sequences of one or more instructions contained in memory 504. Such instructions, also called software and program code, may be read into memory 504 from another computer-readable medium such as storage device 508. Execution of the sequences of instructions contained in memory 504 causes processor 502 to perform the method steps described herein. In alternative embodiments, hardware, such as application specific integrated circuit 520 and circuits in switching system 530, may be used in place of or in combination with software to implement the invention. Thus, embodiments of the invention are not limited to any specific combination of hardware and software.

The signals transmitted over network link 532 and other networks through communications interfaces such as interface 570, which carry information to and from computer system 500, are exemplary forms of carrier waves. Computer system 500 can send and receive information, including program code, through the networks 580, 590 among others, through network links 532 and communications interfaces such as interface 570. In an example using the Internet 590, a server 592 transmits program code for a particular application, requested by a message sent from computer 500, through Internet 590, ISP equipment 584, local network 580 and network link 532b through communications interface in switching system 530. The received code may be executed by processor 502 or switching system 530 as it is received, or may be stored in storage device 508 or other non-volatile storage for later execution, or both. In this manner, computer system 500 may obtain application program code in the form of a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to an infra-red signal, a carrier wave serving as the network link 532b. An infrared detector serving as communications interface in switching system 530 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502 or switching system 530.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising:
    extracting routing data from configuration data received from an initial access server, which is a dynamic host configuration protocol (DHCP) server;
    sending to customer premises equipment the routing data that indicates
        a logical network address for a layer 3 access gateway that routes data packet traffic for access to remote packet-switched network, whereby the layer 3 access gateway is at a node of the remote packet-switched network,
        a logical network address and a media access control (MAC) address for a layer 3 ancillary gateway being part of a plurality of ancillary gateways that routes data packet traffic for an ancillary service wherein the data packet traffic for the ancillary service is not routed through the access gateway to the remote packet-switched network, and
        a range of Internet Protocol (IP) network addresses for one or more servers that provide the ancillary service, the logical network address for the layer 3 ancillary gateway being mapped to the range of IP network addresses, wherein the logical network address for the layer 3 access gateway is mapped to a plurality of IP network addresses not included in the range of IP network addresses, wherein the initial access server includes subscriber routing data indicating a subscriber of the customer premises equipment is authorized to access the ancillary service provided by the one or more servers corresponding to the range of IP network addresses; and
    receiving from the customer premises equipment a data packet with a layer 2 destination address, wherein the layer 3 ancillary gateway is part of the plurality of ancillary gateways that operate to direct traffic associated with their specific ancillary service, wherein the data packet is being routed to a selected ancillary service and the layer 2 destination address corresponds to one of the plurality of ancillary gateways that directs traffic to the selected ancillary service, and wherein the layer 2 destination address is a MAC address that is checked against the routing data extracted from the configuration data to verify if the subscriber is authorized to access the selected ancillary service, and wherein if the subscriber is not authorized to access the selected ancillary service then the data packet is processed without forwarding the data packet to the layer 2 destination address, and
    wherein the plurality of ancillary gateways are connected to an access network, the access network providing a communication link between the customer premises equipment and the access gateway.

2. A method as recited in claim 1, further comprising the step of receiving the configuration data from a network process of the DHCP server that processes an initial request from the customer premises equipment for communicating with the remote packet-switched network.

3. A method as recited in claim 2, wherein:
    said step of receiving the configuration data further comprises receiving a DHCP message with a 121 option directed to the customer premises equipment; and
    said step of sending the routing data to the customer premises equipment further comprises forwarding the DHCP message with the 121 option to the customer premises equipment.

4. A method as recited in claim 2, wherein the network process that processes the initial request from the customer premises equipment is a routing information protocol (RIP) address peer process.

5. A method as recited in claim 1, said step of sending the associated routing data further comprising receiving the configuration data in a message to the customer premises equipment from a network process of the DHCP server that processes an initial request from the customer premises equipment for communicating with the remote packet-switched network.

6. A method as recited in claim 5, wherein the network process that processes the initial request from the customer premises equipment is a routing information protocol (RIP) address peer process.

7. An apparatus, comprising:
    an initial access server, which is a dynamic host configuration protocol (DHCP) server;
    a customer premises equipment; and
    an intermediate node between the DHCP server and the customer premises equipment comprising:
    means for extracting routing data from configuration data received from the initial access server;
    means for sending to the customer premises equipment the routing data that indicates
        a logical network address for a layer 3 access gateway that routes data packet traffic for access to a remote packet-switched network, whereby the layer 3 access gateway is at a node of the remote packet-switched network,
        a logical network address and a media access control (MAC) address for a layer 3 ancillary gateway being part of a plurality of ancillary gateways that routes data packet traffic for an ancillary service wherein the data packet traffic for the ancillary service is not routed through the access gateway to the remote packet-switched network, and a range of Internet Protocol (IP) network addresses for one or more servers that provide the ancillary service, the logical network address for the layer 3 ancillary gateway being mapped to the range of IP network addresses, wherein the logical network address for the layer 3 access gateway is mapped to a plurality of IP network addresses not included in the range of IP network addresses, wherein the initial access server includes subscriber routing data indicating a subscriber of the customer premises equipment is authorized to access the ancillary service provided by the one or more servers corresponding to the range of IP network addresses; and means for receiving from the customer premises equipment a data packet with a layer 2 destination address, wherein the layer 3 ancillary gateway is part of the plurality of ancillary gateways that operate to direct traffic associated with their specific ancillary service, wherein the data packet is being routed to a selected ancillary service and the layer 2 destination address corresponds to one of the plurality of ancillary gateways that directs traffic to the selected ancillary service, and wherein the layer 2 destination address is a MAC address that is checked against the routing data extracted from the configuration data to verify if the subscriber is authorized to access the selected ancillary service, and wherein if the subscriber is not authorized to access the selected ancillary service then the data packet is processed without forwarding the data packet to the layer 2 destination address, and wherein the plurality of ancillary gateways are connected to an access network, the access network providing a communication link between the customer premises equipment and the access gateway.

8. An apparatus, comprising:

an initial access server, which is a dynamic host configuration protocol (DHCP) server;

a customer premises equipment; and an intermediate node between the DHCP server and the customer premises equipment comprising:

means for receiving configuration data from the initial access server, the configuration data including routing data that indicates:

a logical network address for a layer 3 access gateway that routes data packet traffic for access to a remote packet-switched network, whereby the layer 3 access gateway is at a node of the remote packet-switched network, a logical network address and a media access control (MAC) address for a layer 3 ancillary gateway being part of a plurality of ancillary gateways that routes data packet traffic for an ancillary service wherein the data packet traffic for the ancillary service is not routed through the access gateway to the remote packet-switched network, and a range of Internet Protocol (IP) network addresses for one or more servers that provide the ancillary service, the logical network address for the layer 3 ancillary gateway being mapped to the range of IP network addresses, wherein the logical network address for the layer 3 access gateway is mapped to a plurality of IP network addresses not included in the range of IP network addresses, wherein the initial access server includes subscriber routing data indicating a subscriber of the customer premises equipment is authorized to access the ancillary service provided by the one or more servers corresponding to the range of IP network addresses;

means for extracting the routing data from the configuration data; and means for receiving from the customer premises equipment a data packet with a layer 2 destination address;

wherein the layer 3 ancillary gateway is part of the plurality of ancillary gateways that operate to direct traffic associated with their specific ancillary service, wherein the data packet is being routed to a selected ancillary service and the layer 2 destination address corresponds to one of the plurality of ancillary gateways that directs traffic to the selected ancillary service, and wherein the layer 2 destination address is a MAC address that is checked against the routing data extracted from the configuration data to verify if the subscriber is authorized to access the selected ancillary service, and wherein if the subscriber is not authorized to access the selected ancillary service then the data packet is dropped, and wherein the plurality of ancillary gateways are connected to an access network, the access network providing a communication link between the customer premises equipment and the access gateway.

9. An apparatus, comprising:

an initial access server, which is a dynamic host configuration protocol (DHCP) server;

a customer premises equipment; and an intermediate node between the DHCP server and the customer premises equipment comprising:

a network interface that is coupled to an access network for communicating one or more packet flows therewith;

one or more processors;

a computer-readable medium; and one or more sequences of instructions held by the computer-readable medium which instructions, when executed by the one or more processors, causes the one or more processors to carry out the steps of:

extracting routing data from configuration data received from the initial access server;

sending to the customer premises equipment the routing data that indicates a logical network address for a layer 3 access gateway that routes data packet traffic for access to a remote packet-switched network, whereby the layer 3 access gateway is at a node of the remote packet-switched network, a logical network address and a media access control (MAC) address for a layer 3 ancillary gateway being part of a plurality of ancillary gateways that routes data packet traffic for an ancillary service wherein the data packet traffic for the ancillary service is not routed through the access gateway to the remote packet-switched network, and a range of Internet Protocol (IP) network addresses for one or more servers that provide the ancillary service, the logical network address for the layer 3 ancillary gateway being mapped to the range of IP network addresses, wherein the logical network address for the layer 3 access gateway is mapped to a plurality of IP network addresses not included in the range of IP network addresses, wherein the initial access server includes subscriber routing data indicating a subscriber of the customer premises equipment is authorized to access the ancillary service provided by the one or more servers corresponding to the range of IP network addresses; and receiving from the customer premises equipment a data packet with a layer 2 destination address, wherein the layer 3 ancillary gateway is part of the plurality of ancillary gateways that operate to direct traffic associated with their specific ancillary service, wherein the data packet is being routed to a selected ancillary service and the layer 2 destination address corresponds to one of the plurality of ancillary gateways that directs traffic to the selected ancillary service, and wherein the destination address is a MAC address that is checked against the routing data extracted from the configuration data to verify if the subscriber is authorized to access the selected ancillary service, and wherein if the subscriber is not authorized to access the selected ancillary service then the data packet is processed without forwarding the data packet to the layer 2 destination address, and wherein the plurality of ancillary gateways are connected to the access network, the access network providing a communication link between the customer premises equipment and the access gateway.

10. An apparatus as recited in claim 9, wherein execution of the one or more sequences of instructions further causes the one or more processors to carry out the step of receiving the configuration data from a network process of the DHCP server that processes an initial request from the customer premises equipment for communicating with the remote packet-switched network.

11. An apparatus as recited in claim 10, wherein:
said step of receiving the configuration data further comprises receiving a DHCP message with a 121 option directed to the customer premises equipment; and
said step of sending the routing data to the customer premises equipment further comprises forwarding the DHCP message with the 121 option to the customer premises equipment.

12. An apparatus as recited in claim 10, wherein the network process that processes the initial request from the customer premises equipment is a routing information protocol (RIP) address peer process.

13. An apparatus as recited in claim 9, said step of sending the associated routing data further comprising receiving the routing data in a message to the customer premises equipment from a network process of the DHCP server that processes an initial request from the customer premises equipment for communicating with the remote packet-switched network.

14. An apparatus as recited in claim 13, wherein the network process that processes the initial request from the customer premises equipment is a routing information protocol (RIP) address peer process.

15. An apparatus, comprising:
an initial access server, which is a dynamic host configuration protocol (DHCP) server;
a customer premises equipment; and
an intermediate node between the DHCP server and the customer premises equipment comprising:
a network interface that is coupled to the access network for communicating one or more packet flows therewith;
one or more processors;
a computer-readable medium; and
one or more sequences of instructions held by the computer-readable medium which instructions, when executed by the one or more processors, causes the one or more processors to carry out the steps of:

receiving configuration data from an initial access server, the configuration data including routing data that indicates:
a logical network address for a layer 3 access gateway that routes data packet traffic for access to a remote packet-switched network, whereby the layer 3 access gateway is at a node of the remote packet-switched network,
a logical network address for a layer 3 ancillary gateway that routes data packet traffic for an ancillary service wherein the data packet traffic for the ancillary service is not routed through the access gateway to the remote packet-switched network, and
a range of Internet Protocol (IP) network addresses for one or more servers that provide the ancillary service, the logical network address for the layer 3 ancillary gateway being mapped to the range of IP network addresses, wherein the logical network address for the layer 3 access gateway is mapped to a plurality of IP network addresses not included in the range of IP network addresses, wherein the initial access server includes subscriber routing data indicating a subscriber of the customer premises equipment is authorized to access the ancillary service provided by the one or more servers corresponding to the range of IP network addresses;

extracting the routing data from the configuration data; and receiving from the customer premises equipment a data packet with a layer 2 destination address, wherein the layer 3 ancillary gateway is part of a plurality of ancillary gateways that operate to direct traffic associated with their specific ancillary service, wherein the data packet is being routed to a selected ancillary service and the layer 2 destination address corresponds to one of the plurality of ancillary gateways that directs traffic to the selected ancillary service, and wherein the layer 2 destination address is a media access control (MAC) address, which is included in the routing data, and the MAC address is checked against the routing data extracted from the configuration data to verify if the subscriber is authorized to access the selected ancillary service, and wherein if the subscriber is not authorized to access the selected ancillary service then the data packet is dropped, and wherein the plurality of ancillary gateways are connected to the access network, the access network providing a communication link between the customer premises equipment and the access gateway.

16. The apparatus as recited in claim 15, said step of receiving the configuration data further comprising receiving the configuration data in a message to the customer premises equipment from a network process of the DHCP server that processes an initial request from the customer premises equipment for communicating with the remote packet-switched network.

17. The apparatus as recited in claim 16 said step of receiving the configuration data further comprising:
receiving the routing data in a DHCP message with a 121 option directed to the customer premises equipment; and
forwarding the DHCP message with the 121 option to the customer premises equipment.

* * * * *